Oct. 23, 1962 W. A. PITTS 3,059,697
METHOD FOR LOCKING OF PIPE SECTIONS
Original Filed Feb. 14, 1958

INVENTOR.
WILLIAM A. PITTS,
BY
ATTORNEY.

United States Patent Office 3,059,697
Patented Oct. 23, 1962

3,059,697
METHOD FOR LOCKING OF PIPE SECTIONS
William A. Pitts, Bellaire, Tex., assignor, by mesne assignments, to Jersey Production Research Company, Tulsa, Okla., a corporation of Delaware
Original application Feb. 14, 1958, Ser. No. 715,184. Divided and this application Feb. 15, 1960, Ser. No. 8,527
6 Claims. (Cl. 166—49)

The present invention is directed to locking threaded sections of well pipe together. More particularly, the invention is concerned with a method for locking pipe sections together on exposure to well temperatures. In its more specific aspects the present invention is concerned with a composition for locking threaded sections of well pipe together.

This application is a division of Serial No. 715,184, filed February 14, 1958, for William A. Pitts and entitled "Locking of Pipe Sections."

The present invention may be briefly described as a method for locking threaded sections of well pipe together in which a coating of an epoxy resin-containing fluid mass containing a catalytic hardening agent is applied to threads of adjoining first and second pipe sections. Thereafter the first and second pipe sections having the coating of epoxy resin-containing fluid mass thereon are threadedly connected and the connected sections are then lowered into a well bore and there exposed to well temperatures for a sufficient period of time to lock said threaded first and second sections together.

The invention is also concerned with a composition for locking threaded pipe sections together which comprises substantially equal amounts of a fluid epoxy resin and a granular material having a hardness in the range from 7 to 10 Mohs and a minor but effective amount of a heat resistant suspending material and a minor but effective amount of a catalyst for setting said resin at well temperaures within the range from about 100° to about 300° F.

The epoxy resin is suitably a lquid or fluid mass which is plastic at temperatures from about 40° to about 120° F. The epoxy resin has a composition illustrated by the formula:

about 1 hour to about 24 hours, the material reaching about 90 percent of the full strength in from 10 to 24 hours at temperatures slightly above 100° F. A shorter period of time may be employed when the full strength is not required or if the ambient temperature is in the upper range.

The composition of the present invention includes a granular material having a mesh size in the range from about 10 to about 100. A preferred range of mesh size is about 40 to about 100 mesh. This granular material may be selected from a large number of granular materials having a hardness in the range from 7 to 10 Mohs. Illustrative of the granular material are corundum, aluminum oxide, emery, flint, iron quartz, silicon, Carborundum, beryllia, silica, beryllium carbide, titanium carbide, columbium carbide, boron carbide, tungsten carbide, and other granular materials having a similar hardness.

The composition of the present invention also contains a matting or fibrous material which acts as a suspending material for the granular material in the composition. Examples of the matting or fibrous material include asbestos fibers, glass fibers, pumice, talc, diatomaceous earth, and other heat resistant materials which will mat and suspend the granular material in the epoxy-containing fluid.

The composition of the present invention suitably includes about 100 parts by weight of epoxy resin, about 5 to about 75 parts by weight of suspending material, which may be of a matting or fibrous nature, about 100 to 200 parts by weight of the granular material and about 5 to about 15 parts by weight of the catalytic hardening agent. It may sometimes be desirable to use larger amounts of the catalyst. It is to be noted that the granular material and the epoxy resin may be used in substantially equal amounts with minor amounts of the matting or fibrous material and the catalytic hardening agent.

A composition which gives very desirable results may include about 100 parts by weight of epoxy resin, about 15 parts by weight of asbestos fiber, about 112 parts by weight of granular material, specifically silicon carbide, and about 10 parts by weight of catalyst, specifically diethylaminopropylamine. This composition gives particularly desirable results in locking threaded sections of well pipe together.

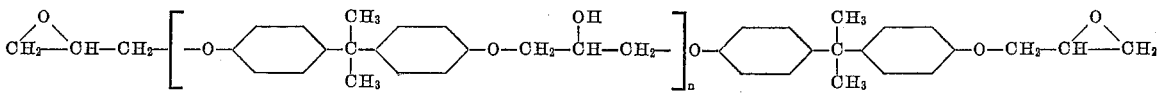

where $n$ is an integer having a value of 1 or a greater number. The resin may be used as such or in a solvent therefor such as in butyl carbitol. Such material, when containing a catalytic hardening agent, will set up to a hard mass and will cement pipe surfaces together.

The catalytic hardening agent employed in the practice of the present invention should be effective at well temperatures in the range from about 100° to about 300° F. Suitable catalytic hardening agents include diethylene triamine, adduct of diethylene triamine and allyl glycidyl ether, metaphenylenediamine, phthalic anhydride, diethylaminopropylamine, and the like. Other compounds suitable as catalytic hardening agents are methylenedianiline, dicyandiamide, and the like.

The catalytic hardening agents of the present invention cause the epoxy resin-containing fluid mass to lock the threaded sections together when exposed to well temperatures in the range from about 60° to about 300° F., preferably from about 100° to about 300° F. for a time, inversely proportionately to the temperature, or from The invention will be further described by reference to the drawing in which.

Figures 1, 2, 3:
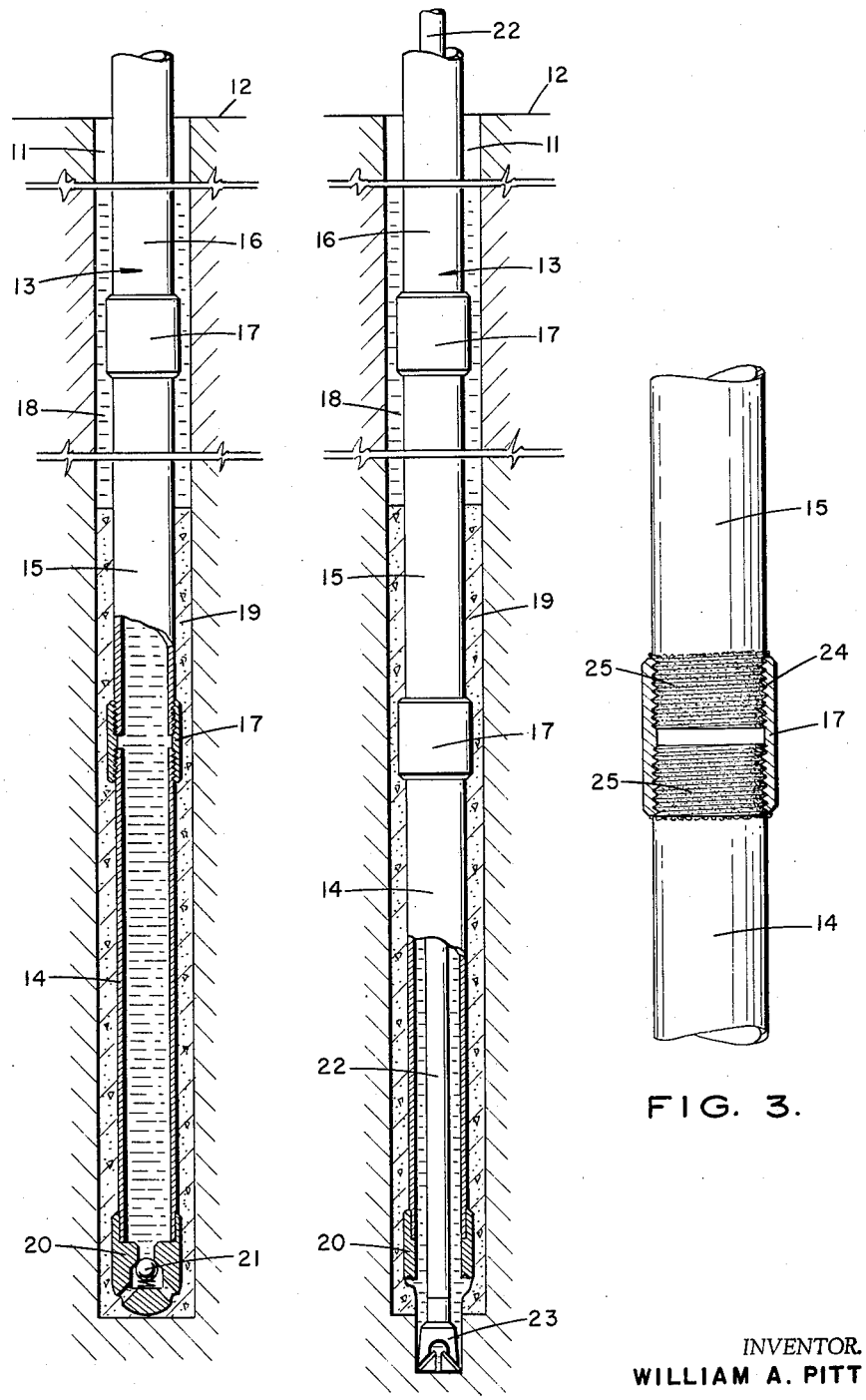
FIGS. 1 and 2 illustrate a stepwise mode of practicing the invention.
FIG. 3 is a view in partial section illustrating the application of the composition to the threads of two well pipes.

Referring now to the drawing, numeral 11 designates a borehole drilled in the earth's surface 12 in which a casing 13 made up of pipe sections 14, 15, and 16 is lowered and arranged therein. The pipe sections 14, 15, and 16 are connected together by couplings 17 which are threaded to the pipe sections 14, 15, and 16. The annulus 18 is then at least partially filled with a body of cement 19, which holds the casing 13 in place. The lower section 14 is provided with the usual cement float shoe 20, having the usual valve 21 arranged therein.

With reference to FIG. 2, a drill string 22 is run into and arranged in the casing 13 and carries on its lower end a drill bit, such as a rock bit 23, which has drilled out the float shoe 20 and the cement below the float shoe 20.

Referring now to FIG. 3, the pipe sections 14 and 15 are joined together by a coupling 17 provided with threads 24 which mate with corresponding threads of pipe sections 14 and 15. A layer 25 of locking composition is applied to the threads of pipe sections 14 and 15 prior to connecting the pipe sections 14 and 15 together with the coupling 17 and lowering same into the borehole 11.

In drilling out the cement and deepening the well bore 11, the drill bit 23 is rotated and this causes torque to be applied to the pipe sections, such as 14 and 15, by virtue of the drilling operation and by virtue of the drill string 22 rotating in contact with the casing 13. Since the drill pipe rotates in a clockwise direction, friction between the drill pipe tool joints acting against the casing applies a rotational force to the casing, also in a clockwise direction, which normally causes the sections to become disengaged. In the practice of the present invention where the locking composition is employed this is prevented.

In employing the composition of the present invention the couplings and thread protectors are removed from pipe such as casing joints and all threads are cleaned of paint-like coatings and oil or grease with a suitable solvent, such as one of the Varsol type. After the threads have been suitably cleaned, the composition of the present invention is applied to the threads and the joint of the two pipe sections is then made up with the normal or usual make-up torque applied. The joined pipe sections are then lowered into a well bore and there exposed to well temperatures which may range from about 100° to about 300° F. for a sufficient period of time which in normal field practice is 24 hours but may range from about 10 to 24 hours. The well temperatures and the exothermic heating of the composition of the present invention due to the catalytic material in addition to that of the curing cement are sufficient to cause the composition to harden and reach a strength for the threaded connection greater than pipe sections which have been skip-welded together in a special manner to normally serve this same purpose. Tests have shown that the torque required to break out a threaded connection of pipe sections which have been locked together with the composition of the present invention is from 5 to 7 times the usual torque required for making up the 5½-inch casing joints tested.

In order to show the beneficial aspects of the present invention, tests were made on connecting pipe in accordance with the present invention and then applying sufficient torque to loosen or break out the threadedly connected pipes. To this end a pipe threading machine was employed which had an electrically powered three-jaw chuck to rotate pipe casing. Commercial type tongs were used to back up the adjoining part of the casing joint, the outer end of the tong arm resting on a hydraulic cylinder equipped with a pressure gauge, the pressure gauge reading in pounds per square inch times 100, giving the torque in pound-feet for either makeup or breakout of a joint. Adjoining threads of sections of pipe were coated with epoxy resin and then made up applying a torque of 3,000 pounds-feet. After allowing the epoxy resin to harden for a sufficient length of time, a breakout torque was applied, and it was found that 15,000 pounds-feet was required. In other instances a makeup torque of 3,300 pounds-feet was applied with a breakout torque of 15,000 being required.

Tests have shown that when pipe joints were made up without the present invention, the breakloose torque was substantially the same as the makeup torque, or an increase of only about 75%. These operations showed that the epoxy resin cemented the pipe joints together effectively.

In other operations, pipe sections were made up with 3,000 pounds-feet torque, and the joints skip welded at spaced apart points. The breakout torque required to break out the thread was 16,000 pounds-feet. As compared to this operation, similar lengths of pipe were made up with 3,000 pounds-feet torque with epoxy resin applied to the threads and the epoxy resin allowed to harden. The breakout torque required was 28,000 pounds-feet. In another operation, pipe threads coated with a mixture of ⅓ iron filings and ⅔ epoxy resin was made up joining two sections of pipe with 3000 pounds-feet of torque applied and after hardening, the breakout torque was 22,000 pounds-feet.

Another mixture of 100 parts of epoxy resin, 20 parts asbestos, 100 parts of silicon carbide of 100 mesh and catalyst was applied to pipe threads of adjoining pipe sections which were made up with an initial torque of 4,500 pounds-feet. This pipe was then subjected to 150° F. for 20 hours and then broken out at 150° F., requiring 24,000 pounds-feet for breaking out.

Another mixture in accordance with the present invention of 100 parts of epoxy resin, 10 parts of asbestos, and 200 parts of silicon carbide of 80 mesh containing a catalyst was applied to pipe threads of adjoining pipe sections, the pipe made up at 5,000 pounds-feet initial torque and subjected to 150° F. for 20 hours and then broken out at 150° F., requiring 22,000 pounds-feet torque.

It will be seen from the numerous examples that the present invention is of considerable importance and utility.

The present invention has been employed with considerable success in locking the bottom joints of casing and the associated float equipment used in a number of wells. The present invention is therefore of considerable utility and advantage in that casings which have been locked together in accordance with the present invention do not become unscrewed as drilling operations are conducted through the pipe. In addition, the danger of damaging the casing joint by welding is eliminated. This latter point is particularly important when high strength alloy casing is run which requires painstaking care and costly rig time to preheat and post heat the welded area to avoid damage by welding.

The nature and objects of the present invention having been completely described and illustrated, what I wish to claim as new and useful and secure by Letters Patent is:

1. A method for locking threaded sections of well pipe together which comprises applying a coating comprising an epoxy resin-containing fluid mass containing a catalytic hardening agent, said fluid mass containing about 100 parts by weight of epoxy resin, about 5 to about 15 parts by weight of heat resistant suspending material, about 100 to about 120 parts by weight of a granular material having a size in the range from about 10 to about 100 mesh and a hardness from 7 to 10 Mohs, and about 5 to about 15 parts by weight of said catalytic hardening agent, to the threads of adjoining first and second pipe sections, threadedly connecting said first and second pipe sections, and then lowering said threadedly connected sections into a well bore and there exposing said threadedly connected pipe sections to well temperatures within the range between about 60° F. and about 300° F. for a period of time in the range from about 1 to about 24 hours sufficient to harden said fluid and to lock said threadedly connected first and second sections together whereby said sections remain locked together at said well temperatures on conducting drilling operations through said well pipe.

2. A method in accordance with claim 1 in which the suspending material is asbestos.

3. A method in accordance with claim 1 in which the granular material is silicon carbide.

4. A method in accordance with claim 1 in which the granular material is corundum.

5. A method in accordance with claim 1 in which the granular material is carborundum.

6. A method in accordance with claim 1 in which the suspending material is asbestos and the granular material is silicon carbide.

References Cited in the file of this patent

UNITED STATES PATENTS

| | | |
|---|---|---|
| 2,145,168 | Flagg | Jan. 24, 1939 |
| 2,321,414 | Parker | June 8, 1943 |
| 2,682,515 | Naps | June 29, 1954 |
| 2,915,490 | Hopper et al. | Dec. 1, 1959 |
| 3,003,798 | Sandlin | Oct. 10, 1961 |